US008230811B2

(12) United States Patent
Matsuo et al.

(10) Patent No.: US 8,230,811 B2
(45) Date of Patent: Jul. 31, 2012

(54) ANIMAL LITTER

(75) Inventors: Takayuki Matsuo, Tokyo (JP); Takeshi Ikegami, Tokyo (JP); Kenji Hiroshima, Tokyo (JP); Hiroshi Matsumoto, Miyagi (JP); Hiroyuki Kameyama, Miyagi (JP)

(73) Assignee: Uni-Charm Corporation, Ehime (JP)

( * ) Notice: Subject to any disclaimer, the term of this patent is extended or adjusted under 35 U.S.C. 154(b) by 0 days.

(21) Appl. No.: 11/718,763

(22) PCT Filed: May 2, 2007

(86) PCT No.: PCT/JP2007/059390
§ 371 (c)(1),
(2), (4) Date: Dec. 10, 2006

(87) PCT Pub. No.: WO2008/096457
PCT Pub. Date: Aug. 14, 2008

(65) Prior Publication Data
US 2009/0211532 A1    Aug. 27, 2009

(30) Foreign Application Priority Data

Feb. 9, 2007   (JP) ................................. 2007-031338

(51) Int. Cl.
*A01K 1/015*   (2006.01)
(52) U.S. Cl. ...................................... 119/173
(58) Field of Classification Search ............... 119/171, 119/172, 173, 174
See application file for complete search history.

(56) References Cited

U.S. PATENT DOCUMENTS

| | | | | |
|---|---|---|---|---|
| 2,805,204 | A * | 9/1957 | Adams, Jr. | 510/215 |
| 4,494,482 | A * | 1/1985 | Arnold | 119/173 |
| 4,591,581 | A * | 5/1986 | Crampton et al. | 502/407 |
| 4,657,881 | A * | 4/1987 | Crampton et al. | 502/80 |
| 4,676,196 | A * | 6/1987 | Lojek et al. | 119/172 |
| 5,035,886 | A * | 7/1991 | Chakrabarti et al. | 424/405 |
| 5,634,431 | A * | 6/1997 | Reddy et al. | 119/173 |
| 5,648,306 | A | 7/1997 | Hahn et al. | |
| 5,788,762 | A * | 8/1998 | Barger et al. | 106/706 |
| 5,819,688 | A * | 10/1998 | Walker | 119/169 |
| 5,901,661 | A * | 5/1999 | Pattengill et al. | 119/173 |
| 5,980,627 | A * | 11/1999 | Marcoux et al. | 106/461 |
| 6,287,550 | B1 * | 9/2001 | Trinh et al. | 424/76.6 |
| 6,402,801 | B1 * | 6/2002 | Faulmann et al. | 71/11 |
| 6,543,385 | B2 * | 4/2003 | Raymond et al. | 119/171 |
| 6,866,709 | B1 * | 3/2005 | Holbek | 106/38.3 |
| 7,603,964 | B2 * | 10/2009 | Jenkins et al. | 119/171 |
| 2004/0025798 | A1 * | 2/2004 | Lee et al. | 119/172 |
| 2004/0079293 | A1 * | 4/2004 | Rasner et al. | 119/172 |
| 2004/0103852 | A1 * | 6/2004 | Schulein et al. | 119/172 |
| 2004/0112297 | A1 * | 6/2004 | Rasner et al. | 119/172 |
| 2005/0145186 | A1 * | 7/2005 | Fung et al. | 119/171 |
| 2007/0105735 | A1 * | 5/2007 | Suga et al. | 510/175 |
| 2007/0181071 | A1 * | 8/2007 | Hurwitz et al. | 119/171 |
| 2008/0029039 | A1 * | 2/2008 | Jenkins | 119/173 |

FOREIGN PATENT DOCUMENTS

| | | |
|---|---|---|
| EP | 0 242 683 A2 | 4/1987 |
| JP | 04-030735 A | 2/1992 |
| JP | 08-505570 A | 6/1996 |
| JP | 2802537 B2 | 9/1998 |
| JP | 2003-023894 A | 1/2003 |
| JP | 2006-042791 | 2/2006 |
| JP | 2006-109832 A | 4/2006 |
| JP | 2006-246797 | 9/2006 |
| WO | WO-95/13134 A1 | 5/1995 |
| WO | WO 01/19177 A1 | 3/2001 |

OTHER PUBLICATIONS

European Supplemental Search Report from corresponding European application No. 07742825.8 dated Feb. 1, 2011 (3 pgs).

* cited by examiner

*Primary Examiner* — Rob Swiatek
*Assistant Examiner* — Ebony Evans
(74) *Attorney, Agent, or Firm* — Brinks Hofer Gilson & Lione

(57) ABSTRACT

Animal litter is provided that causes little damage to the legs or the like of animals using a litter box and generates a small amount of ammonia. The animal litter includes a plurality of particulate matter, in which the plurality of respective particulate matter includes a group of particles configured with an inorganic porous material and an inorganic binder which binds the group of particles together, and the inorganic binder includes a non-cement solidifying agent.

10 Claims, No Drawings

ANIMAL LITTER

CROSS-REFERENCE TO PRIOR APPLICATION

This is a U.S. National Phase Application under 35 U.S.C. §371 of International Patent Application No. PCT/JP2007/059390 filed May 2, 2007, and claims the benefit of Japanese Patent Application No. 2007-031338, filed Feb. 9, 2007 both of which are incorporated by reference herein. The International Application is not yet published at the time of filing this application.

TECHNICAL FIELD

The present invention relates to animal litter which is used as a litter box lining material for animals such as cats and dogs.

BACKGROUND ART

Conventionally, litter configured with particulate matter, which is called "cat litter", packed in a plastic container has been well known as an animal litter box for cats, dogs, and the like kept indoors. Urine excreted by animals is absorbed by such litter. A pet owner removes litter soiled by such urine and feces together with the feces and the like from the container, and then replenishes the amount removed with new litter. However, cats have a habit of stirring the litter with their legs after excretion, and thus the litter to which urine and feces are adhered may adhere to their legs. In addition, since soiled litter spreads, it is difficult to completely remove only the soiled litter.

To solve these problems, an animal litter box where water-repellent particulate matter is used as litter and the litter is spread across a fluid absorbing sheet for absorbing moisture such as urine, and an animal litter box where the litter is spread across the fluid absorbing sheet via a grating or the like, are well known. With such litter boxes, urine excreted by animals passes through the water-repellent particulate matter and is absorbed by the fluid absorbing sheet, allowing suppression of odor generation, in litter replacement frequency reduction, and less work for the pet owner.

Litter configured with a plurality of particulate matter, which is made by solidifying particles of zeolite, sepiolite, or attapulgite with cement, and subjecting it to a water-repellent treatment has been proposed as the animal litter used for such litter boxes (see Patent Document 1).

Patent Document 1: Japanese Unexamined Patent Application Publication No. 2006-246797

DISCLOSURE OF THE INVENTION

Problems to be Solved by the Invention

Nevertheless, with the animal litter disclosed in Patent Document 1, the cement used for solidifying the particles of zeolite or the like has a high pH level, includes many alkaline components, and adherence of the alkaline components to the legs or the like of animals may have a damaging effect on the health of the animals. With the animal litter disclosed in Patent Document 1, elution of the alkaline components included in the particulate matter is suppressed by coating the surface of the particulate matter through a water-repellent treatment; however, the coating on the surface of the particulate matter may peel off over long use, resulting in elution of the alkaline components in the particulate matter. Accordingly, alkaline components may adhere to legs or the like of animals over prolonged use, thereby having a damaging effect on the health of the animals. In addition, with the animal litter disclosed in Patent Document 1, a large amount of ammonia is generated from the excreted urine, causing an unpleasant odor.

Accordingly, an objective of the present invention is to provide animal litter which causes little damage to legs or the like of animals using a litter box, and generates less ammonia by lowering pH levels of the particulate matter configuring the animal litter.

Means for Solving the Problems

As a result of thorough research to solve the aforementioned problems, the inventors have found that a possible solution to the aforementioned problems is the use of particulate matter including a group of inorganic porous particles and a specific inorganic binder as litter, which led to completion of the present invention. More specifically, the present invention provides the following animal litter.

In a first aspect of the present invention, an animal litter is provided including a plurality of particulate matter, in which the plurality of respective particulate matter includes a group of particles configured with an inorganic porous material, and an inorganic binder, which binds the group of particles together, and the inorganic binder includes a non-cement solidifying agent.

In a second aspect of the animal litter as described in the first aspect, the non-cement solidifying agent is a hydraulic-setting agent having principal components of calcium sulfate and magnesium oxide.

In a third aspect of the animal litter as described in the first or second aspect, the inorganic binder is a mixture of the non-cement solidifying agent and cement.

In a fourth aspect of the animal litter as described in any of the first to third aspects, the inorganic porous material is at least one type selected from the group consisting of zeolite, attapulgite, sepiolite, diatomite, and diatom shale.

In a fifth aspect of the animal litter as described in the third or fourth aspect, the cement is low alkali cement.

In a sixth aspect of the animal litter as described in any one of the first to fifth aspects, the plurality of particulate matter includes a pozzolanic material.

In a seventh aspect of the animal litter as described in the sixth aspect, the pozzolanic material is selected from silica gel, diatomite, and diatom shale.

In an eighth aspect of the animal litter as described in the sixth or seventh aspect, a content of the inorganic binder of the plurality of particulate matter is 5 to 30 percent by mass, and a content of the pozzolanic material is 3 to 20 percent by mass.

In a ninth aspect of the animal litter as described in any one of the first to eighth aspects, the plurality of particulate matter is subjected to a water-repellent treatment.

In a tenth aspect of the animal litter as described in any one of the first to ninth aspects, the particulate matter includes a fragrance.

In an eleventh aspect of the animal litter as described in any one of the first to tenth aspects, the particulate matter has an average particle pH of no more than 12.

In a twelfth aspect of the animal litter as described in any one of the first to eleventh aspects, the particulate matter has an average strength of no less than 30 N.

In a thirteenth aspect of the animal litter as described in any one of the first to twelfth aspects, the particulate matter has a cylindrical shape of 4 to 7 millimeters in average particle diameter, and 6 to 15 millimeters in average particle length.

Effects of the Invention

The animal litter of the present invention causes little damage to legs or the like of animals, and generates a small amount of ammonia by lowering pH levels of the particulate matter configuring the animal litter.

PREFERRED MODE FOR CARRYING OUT THE INVENTION

The present invention is described below based on preferred embodiments. Animal litter of the present invention includes a plurality of particulate matter.

The particulate matter used for the present invention is mainly configured with a group of inorganic porous particles, and is made by binding many inorganic porous particles together by means of an inorganic binder.

Zeolite, sepiolite, attapulgite, diatomite, diatom shale, or the like may be given as the inorganic porous materials used for the present invention. With the present invention, one of these types may be used, or a mixture of two types or more may also be used. Since the inorganic porous materials have a property of absorbing ammonia odor or the like, configuration of particulate matter mainly with the inorganic porous particles allows animal litter with excellent odor eliminating ability to be provided.

It is preferable that inorganic porous particles with small particle size are used in light of increasing the strength of particulate matter configured with the particles. More specifically, it is preferable that the particle size of the inorganic porous particles used for the present invention be 300 micrometers or less, more preferably 200 micrometers or less, and most preferably 100 micrometers or less.

It is preferable that the content of inorganic porous particles in the particulate matter used for the present invention be from 50 to 95 percent by mass, and more preferably 70 to 90 percent by mass. If the content of the inorganic porous particles is less than 50 percent by mass, the odor eliminating effect of the particulate matter may decrease. In addition, if the content of the inorganic porous particles is more than 95 percent by mass, the particulate matter may not achieve sufficient crush strength.

The inorganic binder used for the present invention includes a non-cement solidifying agent.

In this specification it should be noted that cement refers to a solidifying agent having a principal component of calcium silicate, and is hardened through reaction with water (hydration); the non-cement solidifying agent refers to a solidifying agent other than cement, that is, having a principal component that is not calcium silicate.

Dolomite, calcium oxide, calcium sulfate, magnesium oxide, or the like may be provided as the non-cement solidifying agent. With the present invention, it is preferable to use a hydraulic-setting agent having principal components of calcium sulfate and magnesium oxide as the non-cement solidifying agent. It should be noted that the hydraulic-setting agent refers to a solidifying agent hardened through reaction with water (hydration).

Hydraulic-setting agents having principal components of calcium sulfate and magnesium oxide, which are preferably used for the present invention, are almost neutral, and magnesium hydrate, generated when the solidifying agent is hardened, is a weak base. Accordingly, the particulate matter to be formed is also a weak base, resulting in a reduction in the burden to the legs or the like of animals using the litter box.

Moreover, the particulate matter becoming weak bases, that is, reduction in pH levels of the particulate matter to be formed, may suppress ammonia generation from urine.

This is because it becomes difficult to cause an ammonia release reaction from urine when the urine comes into contact with the particulate matter.

The calcium sulfate content in the hydraulic-setting agent, having principal components of calcium sulfate and magnesium oxide, is preferably from 50 to 95 percent by mass, and the magnesium oxide content is preferably from 5 to 50 percent by mass. Note that the calcium sulfate content means the content which is converted into an anhydrate.

The hydraulic-setting agent used for the present invention, having principal components of calcium sulfate and magnesium oxide, may include components other than calcium sulfate and magnesium oxide. An accelerator and another metal oxide may be provided as such components. A chloride of barium, magnesium, calcium, sodium, potassium, phosphorus, or the like, and an inorganic salt such as nitrate, nitrite, hydrosulfate, sulfite salt, or the like may be given as the accelerator. An oxide of barium, calcium, sodium, potassium, phosphorus, aluminum, silicon, iron, or the like may be given as the other metal oxide. The content of components other than calcium sulfate and magnesium oxide in the hydraulic-setting agent, having principal components of calcium sulfate and magnesium oxide, is preferably less than 20 percent by mass, and more preferably less than 10 percent by mass.

Use of a mixture of cement and the hydraulic-setting agent, having principal components of calcium sulfate and magnesium oxide, is preferred as the inorganic binder used for the present invention. Use of such a mixture allows for an increase in the strength of the particulate matter, and suppression of an increase in pH levels of the particulate matter due to the use of cement.

Portland cement, white cement, or the like may be provided as the cement used for the present invention.

In addition, it is preferable that low alkali cement is used for the present invention. The low alkali cement is made by adjusting an alkali metal (Na, K) content of the cement so as to be lower than a predetermined content. The use of the low alkali cement allows for a further decrease in pH levels of the particulate matter.

In the present invention, it is preferable that the inorganic binder content in the particulate matter is from 5 to 30 percent by mass, and more preferably 10 to 20 percent by mass. If the entire inorganic binder content is less than 5 percent by mass, the particulate matter may not achieve sufficient crush strength. In addition, if the entire inorganic binder content is more than 30 percent by mass, the odor eliminating effect for the particulate matter may decrease.

Moreover, the non-cement solidifying agent content in the inorganic binder is preferably 20 percent by mass or greater, and more preferably 40 percent by mass or greater. If the non-cement solidifying agent content is less than 20 percent by mass, pH levels of the particulate matter may not decrease sufficiently.

A pozzolanic material may be added to the particulate matter used in the present invention in addition to the inorganic porous particles and the inorganic binder. A pozzolanic material is a generic term for a fine powder having a principal component of silica, and is a material which reacts with calcium hydroxide, thereby generating calcium-silicate hydrate, which is stably insoluble. Silica gel, diatomite, diatom shale, or the like may be provided as such pozzolanic material. Addition of such pozzolanic material allows a further decrease in pH levels of the particulate matter.

This is because the pozzolanic reaction, which is caused when calcium hydroxide generated through the hydration reaction of the cement components in the particulate matter reacts with the silicic acid, reduces the amount of the calcium hydroxide in the cement.

As mentioned above, a decrease in pH levels of the particulate matter may suppress ammonia generation. Alternatively, since such pozzolanic material has an odor absorbing property of components such as ammonia, an absorption effect of ammonia by the pozzolanic material also may suppress ammonia generation.

Moreover, there is another effect where the bonding force of calcium-silicate hydrate, which is generated through the pozzolanic reaction, improves the strength of the particulate matter.

In the present invention, it is preferable that silica gel is used as the pozzolanic material. Any of A-type silica gel, B-type silica gel, and C-type silica gel may be used as the silica gel used for the present invention; however, C-type silica gel is preferably used because it has many pores and excellent absorption capacity of water and ammonia.

It is preferable that the pozzolanic material content in the particulate matter used for the present invention is from 3 to 20 percent by mass, and more preferably 5 to 15 percent by mass.

It should be noted that diatomite and diatom shale may be used as both the inorganic porous material and the pozzolanic material; however, in the present invention, when the content of the diatomite or the diatom shale in the particulate matter is 20 percent by mass or less, they function as the pozzolanic material. In addition, when the content of the diatomite or the diatom shale in the particulate matter is more than 20 percent by mass, they function as the inorganic porous material.

It is preferable that the particulate matter used for the present invention is subjected to a water-repellent treatment. The water-repellent treatment for the particulate matter improves fluid penetration of the particulate matter. In addition, it becomes difficult for fluid such as urine to be absorbed into the particulate matter, extending the life span of the particulate matter. Moreover, the amount of fluid remaining in the particulate matter may be reduced, allowing for a reduction in the generation of odor.

The water-repellent treatment may be performed, for example, by spraying and coating a water-repellent agent on the surface of the particulate matter. Wax resin such as paraffin wax, silicon resin, fluorine wax, or the like may be used as the water-repellent agent.

When coating the water-repellent agent on the surface of the particulate matter, it is preferable that the amount of coating with respect to the mass of the particulate matter be from 0.05 to 1 percent by mass, and more preferably 0.1 to 0.5 percent by mass.

It is also preferable that the particulate matter used for the present invention contain a fragrance. The masking effect of the fragrance allows for a suppression of the odor of urine, feces, and the like. A type of alcohol such as geraniol, citronellol, citral, eugenol, phenethyl alcohol, thymol, linalool, leaf alcohol, menthol, benzyl alcohol, or the like, and a type of aldehyde such as hexylcinnamaldehyde, or the like, are favorably used as the fragrance.

The granulation shape of the particulate matter used for the present invention is not limited to a spherical shape, cylindrical shape, or the like; however, it is preferable that they be granulated in a cylindrical shape in light of providing litter with less spattering during use.

The particulate matter used for the present invention may be granulated by means of a disk pelleter, a briquette machine, a tableting machine, or the like. Of these, the disk pelleter is preferably used for granulation.

In addition, when granulating the particulate matter into a cylindrical shape, the average particle diameter of the particulate matter (diameter of the bottom of the cylindrical shape) is preferably from 4 to 7 millimeters, and more preferably 5.5 to 6.5 millimeters. The average particle length of the particulate matter (height of the cylindrical shape) is preferably from 6 to 15 millimeters, and more preferably 8 to 12 millimeters.

In this case, the average particle diameter is determined by measuring the particle diameters of twenty granules of particulate matter, and taking the average value thereof. In addition, the average particle length is determined by measuring the particle lengths of fifty granules of particulate matter, and taking the average value thereof.

It is preferable that the average particle pH level of the particulate matter used for the present invention be not greater than 12. Setting the average particle pH level of the particulate matter to 12 or less allows for a reduction in the burden to the legs or the like of animals, and suppression of ammonia generation.

The average particle pH level of the particulate matter may be measured according to the following method.

pH Level Measuring Method

The particulate matter was crushed into pieces, sieved using a 80-mesh sieve, and the pieces that pass through the sieve are used as test samples.

2.5 milliliters of distilled water was dripped per 1 gram of test sample, slightly stirred, and then left at rest.

After 30 minutes had elapsed, the pH levels of the test samples were measured using a pH meter (manufactured by HANNA Instruments, Skincheck).

It is preferable that the average particle strength of the particulate matter used for the present invention be no less than 30 N, and more preferably no less than 50 N. If the average particle strength is less than 30 N, the particulate matter may break during use, making it easier for the litter to scatter.

The average particle strength of the particulate matter may be measured according to the following method.

Particle Strength Measuring Method

The particulate matter left for 24 hours or more in an atmosphere of 25 degrees centigrade and humidity of 60 percent are used as test samples.

The particulate matter used as the test samples was placed on a measuring table of a manual handle-type digital force gauge stand (manufactured by NIDEC-SHIMPO Corporation, FGS-50H).

A digital force gauge (manufactured by NIDEC-SHIMPO Corporation, FGN-50B) was attached to the digital force gauge stand, and set so that the tip of a measurement adapter (bump shape: 70 degree angle cone) made contact with the particulate matter.

The handle was turned slowly by hand, and the particulate matter was compressed by means of the measurement adapter. The force at the time that the particulate matter broke was determined as a particle strength measurement value.

Measurement was carried out 10 times, and the average value thereof was determined as the average particle strength.

It should be note that if the particulate matter is in a cylindrical shape, the particle strength was measured by setting the tip of the measurement adapter so as to make contact perpendicular to the height direction of the particulate matter.

Next, a preferred manufacturing method for the animal litter of the present invention is described below.

The particulate matter configuring the litter of the present invention is granulated from a mixture including the inorganic porous materials and the inorganic binder. At first, the inorganic porous materials and the inorganic binder were mixed at a predetermined ratio, water was added, and then mixture was stirred and mixed uniformly using a mixer so as to prevent the generation of clumps.

It should be noted that to include a pozzolanic material such as silica gel in the particulate matter, the pozzolanic material was mixed in addition to the inorganic porous materials and the inorganic binder during the stirring and mixing step.

The particulate matter was granulated using this mixture. The particulate matter used for the present invention may be granulated by means of a granulator for various fine particles such as a disk pelleter, a briquette machine, a tableting machine, or the like.

Next, the resulting particulate matter was left to stand for a predetermined time period in order to accelerate solidification of cement and pozzolanic reaction. This step is referred to as a curing step. It is preferable that the curing period be 72 hours or more in light of sufficient solidification of the cement, although it differs according to temperature.

Afterwards, sufficiently solidified particulate matter was dried using a dryer. This drying step was performed by way of a rotary kiln dryer, for example. It is preferable that drying is performed so that moisture percentage of the particulate matter is 10 percent or less.

The moisture percentage is calculated by a second drying of the dried particulate matter for 24 hours at 110 degrees centigrade, regarding the difference in mass of the particulate matter before and after the second drying as the moisture amount, and dividing the moisture amount by the mass of the particulate matter before the second drying.

Large and small particulate matter is removed from the resulting particulate matter in a sifting step, resulting in yielding particulate matter with a predetermined size.

The animal litter of the present invention is manufactured in this manner.

Since the animal litter of the present invention has high rate of fluid penetration, it is favorably used for an overlap structured animal litter box made by spreading litter across a fluid absorbing sheet for absorbing moisture such as urine directly, or via a grating or the like.

EXAMPLE

The present invention is described in further detail below while referring to working examples. However, the scope of the present invention is not limited to the working examples.

First Working Example (1) Mixing and Granulating Raw Materials for Particulate Matter Zeolite powder (product of Ayashi, Miyagi Prefecture, 60-mesh pass product, average particle diameter of 150 micrometers, moisture of no more than 7 percent) of 70 parts by mass, 10 parts by mass of a non-cement solidifying agent (components: 80 percent by mass of calcium sulfate hemihydrate, 15 percent by mass of magnesium oxide, and 5 percent by mass of other metal oxides), 10 parts by mass of white cement (manufactured by Taiheiyo Cement Corporation), and 10 parts by mass of C-type silica gel (product of Qingdao, China) were mixed, followed by adding 40 parts by mass of water, and then stirred and mixed using a loedige mixer.

The stirred and mixed mixture was compressed and granulated by a disk peletter (manufactured by Dalton, Co., Ltd.). The outlet opening dimension of the disk was 5.5 millimeters in diameter, 35 millimeters in disk thickness, and 12 millimeters in effective length.

The resulting particulate matter was 5.5 millimeters in diameter and 25 millimeters in average particle length.

(2) Curing Step

The resulting particulate matter was left for 72 hours at a temperature of 20 degrees centigrade to accelerate solidification of cement and pozzolanic reaction.

(3) Drying Step

The particulate matter subjected to the curing step was dried until the resulting moisture percentage was 10 percent or less by means of a rotary kiln dryer. In the drying step, the particulate matter was compressed, and breakage occurred in a portion thereof. As a result, the particulate matter obtained after the drying step was 5.5 millimeters in diameter and 9 millimeters in average particle length.

(4) Water-Repellent Agent Coating Step

Wax resin (manufactured by Nicca Chemical Co., Ltd., TH-44) was used as a water-repellent agent. A 50 times diluted with water solution of the water-repellent agent was coated to be 10 percent by mass with respect to the mass of the particulate matter. The coating was performed by spraying the water-repellent agent solution while stirring and mixing the particulate matter.

(5) Sifting Step

The resulting particulate matter was sifted through a sieve with a 10 millimeter×10 millimeter mesh to remove particulate matter larger than a predetermined size, and then sifted through a sieve with a 5 millimeter×10 millimeter mesh to remove particulate matter and powdery matter smaller than the predetermined size. As a result, particulate matter within a predetermined range of sizes was provided.

In this manner, the animal litter of the first working example was provided.

Second Working Example

Animal litter of a second working example was provided in the same manner as in the first working example except that 70 parts by mass of zeolite powder, 10 parts by mass of a non-cement solidifying agent, 10 parts by mass of white cement, and 10 parts by mass of silica gel were used as the raw materials for particulate matter of (1) in the first working example, and a water-repellent agent was not coated.

Third Working Example

Animal litter of a third working example was provided in the same manner as in the first working example except that 75 parts by mass of zeolite powder, 10 parts by mass of a non-cement solidifying agent, 10 parts by mass of white cement, and 5 parts by mass of diatomite were used as the raw materials for particulate matter of (1) in the first working example.

Comparative Example

Animal litter of a comparative example was provided in the same manner as in the first working example except that 80 parts by mass of zeolite powder and 20 parts by mass of white cement were used as the raw materials for particulate matter of (1) in the first working example.

The average particle pH level, amount of generated ammonia, average particle strength, and fluid penetration were measured for the animal litter provided by the working examples and the comparative example. The results are shown in Table 1.

It should be noted that the average particle pH level and average particle strength were measured according to the aforementioned methods. In addition, the amount of generated ammonia and fluid penetration were measured according to the following methods.

Measuring Method for Amount of Generated Ammonia

The particulate matter of 50 milliliters was soaked in cat urine for 10 minutes, extra urine was wiped off with a disposable paper cloth (manufactured by Nippon Paper Crecia Co., Ltd., Kim wipe), and then the particulate matter was sealed in a 200 milliliter container.

The container was left to rest for 96 hours in a constant temperature bath of 35 degrees centigrade, and the amount of generated ammonia was measured by way of a detector tube.

Fluid Penetration Measuring Method

A cylinder of 50 millimeters in diameter and 30 millimeters in depth was provided on the top surface of a grating having many openings of 3 millimeter×8 millimeter in size. The cylinder was filled with the particulate matter, and 20 milliliters of normal saline solution was dripped from a height of 20 millimeters above the cylinder over a period of 10 seconds. A tray accommodating the particulate matter and the normal saline solution that passed through the grating was provided on the bottom of the grating, and the mass (A) of the normal saline solution having passed through the grating after 15 seconds had elapsed upon completion of dripping was measured. Fluid penetration was found by the following equation.

Fluid penetration(%)=$A$/20×100 wherein the inorganic porous material comprises at least one member selected from the group consisting of zeolite, attapulgite, sepiolite, diatomite and diatom shale, and wherein the pozzolanic material comprises silica gel wherein the content of the pozzolanic material in the particulate matter is 5 to 15 percent by mass, and wherein the plurality of particulate matter is subjected to a water-repellent treatment.

2. The animal litter according to claim 1, wherein the non-cement solidifying agent is a hydraulic-setting agent including as principal components calcium sulfate and magnesium oxide.

3. The animal litter according to claim 1, wherein the inorganic binder is a mixture of the non-cement solidifying agent and cement.

4. The animal litter according to claim 3, wherein the cement is low alkali cement.

5. The animal litter according to claim 1, wherein the pozzolanic material further comprises at least one of diatomite and diatom shale.

6. The animal litter according to claim 1, wherein a content of the inorganic binder in the particulate matter is 5 to 30 percent by mass.

7. The animal litter according to claim 1, wherein the particulate matter includes a fragrance.

TABLE 1

| | Inorganic Porous Material | | Inorganic Binder | | | | Pozzolanic Material | | Water-Repellent | | Generated | | Fluid |
|---|---|---|---|---|---|---|---|---|---|---|---|---|---|
| | | (Percent by mass) | Non-cement | (Percent by mass) | Cement | (Percent by mass) | | (Percent by mass) | Agent Additive Amount | pH | Amount of $NH_3$ (ppm) | Particle Strength N | Penetration % |
| First Working Example | Zeolite | 70 | $CaSo_4$ + MgO | 10 | White cement | 10 | Silica gel | 10 | 0.2% | 10.5 | 7 | 75 | 96.2 |
| Second Working Example | Zeolite | 70 | $CaSo_4$ + MgO | 10 | White cement | 10 | Silica gel | 10 | — | 10.1 | 12 | 64 | 88.1 |
| Third Working Example | Zeolite | 75 | $CaSo_4$ + MgO | 10 | White cement | 10 | Diatomite | 5 | 0.2% | 11.1 | 8 | 95 | 95.9 |
| Comparative Example | Zeolite | 80 | — | — | White cement | 20 | — | — | 0.2% | 11.4 | 38 | 80 | 95.0 |

As is apparent from the results shown in Table 1, the animal litter of the working examples has low pH levels and a small amount of ammonia generated. On the contrary, the animal litter of the comparative example has a high pH level and a large amount of ammonia generated.

The invention claimed is:

1. Animal litter comprising a plurality of particulate matter, wherein
    granules of the particulate matter have an average pH of no more than 12;
    the particles include an inorganic porous material; and
    an inorganic binder, which binds particles together, and a pozzolanic material
    wherein the inorganic binder includes a non-cement solidifying agent, and 8. The animal litter according to claim 1, wherein the particulate matter has an average strength of no less than 30N.

9. The animal litter according to claim 1, wherein the particulate matter has a cylindrical shape of 4 to 7 millimeters in average particle diameter and 6 to 15 millimeters in average particle length.

10. The animal litter according to claim 1, in combination with a litter container and an absorbent sheet for absorbing liquids wherein
    the animal litter is in the litter container in which the absorbent sheet for absorbing liquid is disposed and the animal litter is located directly or indirectly on the absorbent sheet.

* * * * *